United States Patent Office 3,454,739
Patented July 8, 1969

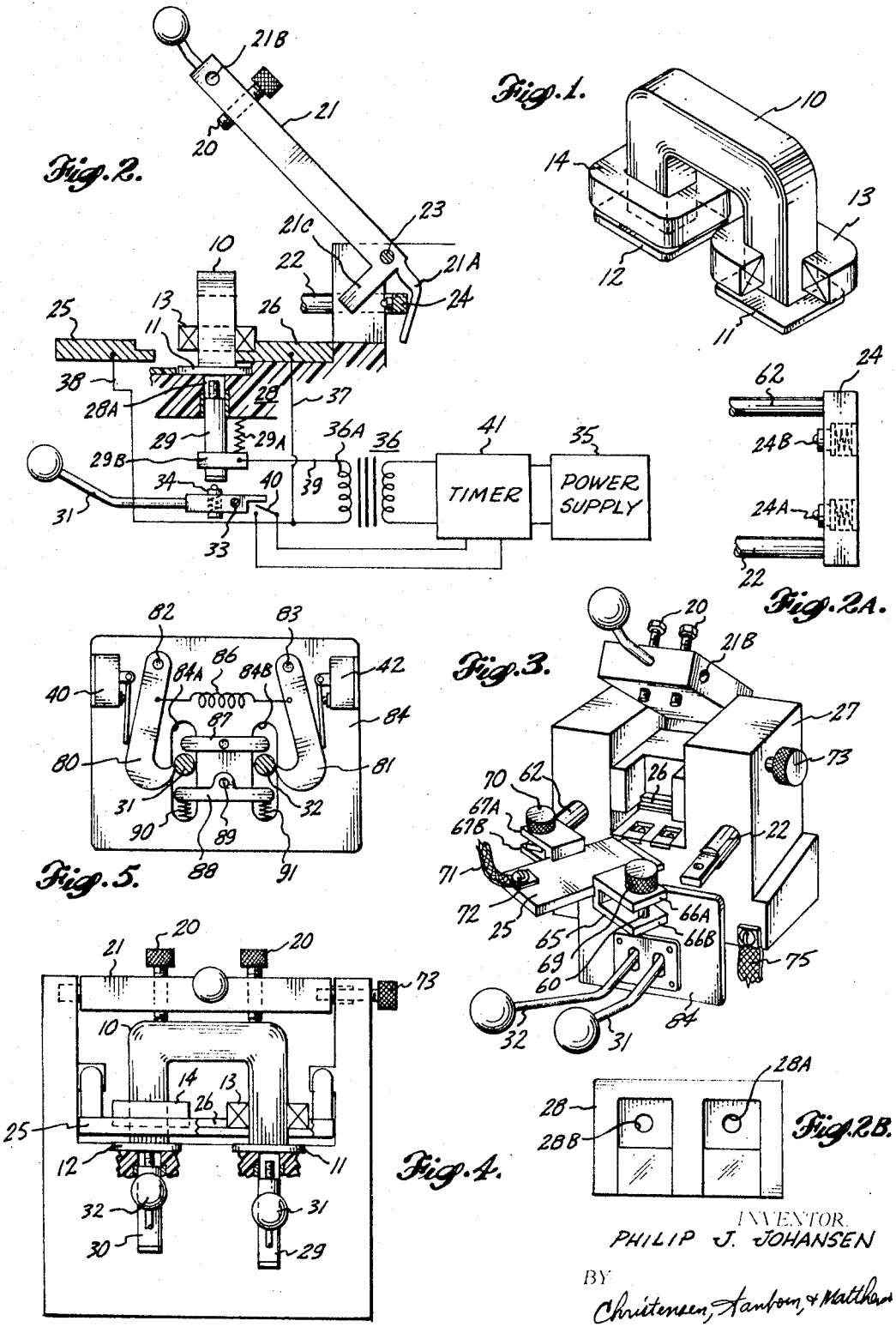

3,454,739
APPARATUS FOR WELDING POLE PIECES TO LAMINATED CORES
Philip J. Johansen, Alderwood Manor, Wash., assignor to Electro Development Corporation, Seattle, Wash., a corporation of Washington
Filed Jan. 23, 1967, Ser. No. 610,914
Int. Cl. B23k *11/00*
U.S. Cl. 219—78                                                11 Claims

ABSTRACT OF THE DISCLOSURE

Apparatus is disclosed for welding pole pieces of material such as stainless steel to the ends of laminated structures such as laminated cores. After proper cleaning the edges of the multiple laminations of a core structure are engaged by electrodes, preferably by a pair of electrodes urged toward each other with the laminated structure therebetween in a manner such that current flow readily occurs from the electrodes to the multiple laminations. The pole face is maintained under pressure in firm engagement with the end of the core structure. A third electrode of opposite polarity to the first two is maintained in positive engagement with the pole face so that the momentary passage of current between the electrodes of opposite polarity results in a firm weld joint. The apparatus disclosed includes a welding fixture having suitable interlocks for assuring safe and uniform welding of first one pole piece and then another to the ends of the two legs of U-shaped core assemblies with provision being made for having coils disposed about the legs during the welding operation.

---

The present invention relates in general to laminated core structures having pole faces welded to an end thereof and to novel apparatus for producing the same. In the utilization of laminated core structures it is found that certain advantages can be obtained if plates referred to as pole faces are permanently affixed to the ends of the structure. One such example is in the case of proximity switches of the type wherein a U-shaped core is provided with end plates and has coils disposed about the core legs for energization and field sensing. With steel pole faces welded to the ends of a U-shaped core assembly the system operation is not only enhanced but also the sensing unit can then be made extremely resistant to adverse environmental conditions.

It is an object of the present invention to provide an improved apparatus for welding a metal plate to a laminated structure. Another object of the present invention is to provide a novel apparatus for permitting an unskilled welder to repeatedly make uniform welds in securing a metallic pole face to the end of a laminated core structure. Another object of the present invention is to provide a welding apparatus for welding first one and then another pole face to the first and second ends of a U-shaped ferromagnetic laminated core structure. An additional object of the invention is to provide a welding fixture for welding pole faces to the ends of U-shaped cores.

The above and other advantages and objects are achieved in accordance with the present invention through the use of a welding technique comprising the steps of placing at least one elongated electrode across the multiple laminations of a laminated core structure and maintaining pressure between the electrode and the core structure to insure a low resistance contact. A pole face, as for example of stainless steel, is held in engagement with the end of the core structure having the first electrode disposed across the edges of the laminations. A second electrode is urged under pressure against the pole face while current is passed from one electrode to the other via the laminations and the pole face.

The apparatus disclosed herein includes a fixture having a core holding section with movable pressure means being selectively engaged with the core assembly to urge the same into firm engagement with a pole face member. One set of electrodes carried by a movable frame is adapted to engage one side of the multiple laminations to not only form a low resistance current flow path between the electrode and the laminations, but also to urge the opposite edges of the laminated structure into engagement with a similar electrode held stationary in the fixture. A third electrode responsive to movement of a control lever is selectively engaged with the pole face by being movable through an insulating material base plate on which the pole face is supported. A timing circuit is provided and is responsive to movement of the control for the third electrode to cause energization of the weld circuit for a predetermined length of time and after engagement of the third electrode with the pole face has been assured. In the preferred embodiment illustrated herein the apparatus is particularly well suited for welding pole faces to each of the ends of U-shaped core members. Thus a fourth movable electrode similar to the third movable electrode is provided. To insure high quality welds without the need for unduly heavy duty welding equipment the apparatus disclosed makes use of first and second electrodes adapted to simultaneously engage the laminations of both legs of the U-shaped core. Interlocks provided between first and second control levers then serve to prevent the simultaneous welding of both pole faces to the ends of the U-shaped core.

The above as well as additional advantages and objects of the invention will be more clearly understood from the following description when read with reference to the accompanying drawings wherein, FIGURE 1 is a perspective view of a typical laminated core and pole face structure manufactured in accordance with the present invention and having appropriate drive and sensing windings disposed on the legs thereof.

FIGURE 2 is a cross-section of one preferred embodiment of the invention, partially in diagrammatic form to illustrate the manner in which various parts of the apparatus of the present invention cooperate to permit an unskilled person to fabricate structures of the type illustrated in FIGURE 1.

FIGURES 2A and 2B are top views of part of the plate holding and shaft actuation assemblies for the apparatus of FIGURES 2 and 3.

FIGURE 3 is an isometric view of a preferred embodiment of the welding apparatus for welding pole faces to each of the ends of a U-shaped laminated core structure.

FIGURE 4 is a front view of the apparatus in FIGURE 3 with a part of the apparatus in cross section to illustrate the relationship of various parts.

FIGURE 5 is a rear elevation of the interlocks associated with the control levers of the apparatus shown in FIGURE 3.

In FIGURE 1 there is illustrated a laminated ferromagnetic core structure 10 having stainless steel plates 11 and 12 welded to the ends of the legs of the core. Electrical windings or coils 13 and 14 are disposed about the legs of the core. The assembly shown in FIGURE 1 is adapted for use in a proximity sensing system.

In the illustration of FIGURE 2, it will be seen that the core 10 is held in position on the steel plate 11 by means of the adjustable set screws 20 threaded through the weld fixture arm or lever 21. The lever 21 is pivoted on shaft 23 and has downwardly extending ends 21A and 21B. The lower ends 21A and 21B are disposed on opposite sides of the cross bar 24 carried on the rear end of shafts 22 and 62. A pair of spring members 24A and 24B carried by cross bar 24 provide a yielding connection between the shafts 22 and 62 and the end 21A. The arrangement is such that when the lever 21 is moved clockwise the shafts 22 and 62 are driven to the left. When the member 21 is swung counterclockwise to its closed position with the set screw 20 engaged with the top of the core 10 the shafts 22 and 62 are held to the right under the pressure of the spring members 24A and 24B. A suitable opening 21C is provided in the edge of the cover 21 to permit locking of the lever 21 in its closed position in the manner described hereinafter.

It will be seen in FIGURES 2 and 3 that the front end of the shafts 22 and 62 carry a first copper electrode 25 which is provided with a stepped portion 25A adapted to accommodate the coils 13 and 14 positioned about the legs of the core 10 prior to welding of the plates 11 and 12 thereto. A second electrode 26 substantially identical to the electrode 25 is held in fixed position on the support structure 27. An insulating member 28 seen most clearly in FIGURE 2B is provided with a pair of depressions for holding the plates 11 and 12. The dielectric support 28 is provided with openings 28A and 28B through which electrodes 29 and 30 are selectively moved toward and away from the lower surface of the steel plates 11 and 12.

A pair of control levers 31 and 32 serve to control movement of the electrodes 29 and 30. The two levers are supported in the same way and as shown most clearly in FIGURES 1 and 5. In FIGURE 1 it will be seen that lever 31 is pivoted on pin 33 and carries a spring member 34 which is disposed beneath the electrode 29. An insulating pad 35 on the end of the electrode 29 energizes the spring member 34. A return spring 29A compressed between the cable attachment member 29B on electrode 29 and the support 28 urges the electrode 29 downward. The arrangement is such that when the lever 31 is moved upwardly (clockwise in FIGURE 2) the electrode 29 will be moved upwardly under a yielding pressure in a manner such that uniform pressure engagement of the electrode 29 with the lower edge of the steel plate 11 is achieved during each operation of the lever 31.

The apparatus makes use of conventional welding apparatus including the A.C. power supply 35 and transformer 36. One end of the secondary winding 36A is connected by leads 37 and 38, respectively, to the electrodes 25 and 26 while the opposite end of the secondary winding 36A is connected by lead 39 to the electrodes 29 and 30. The arrangement is such that when the power is applied to the transformer in the manner set forth hereinafter the current flow between electrodes 25 and 26 and one or the other of the electrode 29 or 30 will serve to weld the plate 11 or plate 12 to the end of the core structure 10.

It will be seen in FIGURE 2 that when the lever 31 is rotated clockwise the end thereof serves to close the switch 40 and thus render operable the timer 41 which is connected in control relationship between the power supply 35 and the transformer 36. A similar switch 42 is provided for lever 32. The operation is such that when the switch 40 or the switch 42 is closed the timer 41 is activated. Then at a predetermined time thereafter the timer 41 applies power from supply 35 to transformer 36 for the necessary duration for a proper weld to be formed. By delaying energization of the power supply until a predetermined time after the electrode 29 or electrode 30 has been engaged with the steel plate 11 or 12 arcing is avoided and a uniform weld is made on each assembly. This also avoids any blowing of metal which might otherwise occur during the actual welding. As described hereinafter, the levers 29 and 30 are locked in their elevated positions during the actual welding operation.

As seen in FIGURE 3, electrode 25 is carried by the electrode holder 65 which has pairs of separated steel plates 66A and 66B and 67A and 67B adapted to respectively engage the flatted ends of the shafts 22 and 62 extending outwardly from the main support block 27. Each of the shafts 22 and 62 is provided with a vertical hole through the outer end thereof through which pins 68 secured to the ends of the respective knobs 69 and 70 pass for holding the electrode 25 to the shafts 22 and 62. Thus when the shafts are moved rearwardly by the lever 21 the electrode 25 will undergo movement toward the stationary electrode 26 (FIGURE 2). The arrangement is such that the electrodes 25 and 26 can be readily removed from the assembly for cleaning and/or replacement. Current is carried to the electrode 25 by the heavy cable 71 which is held in position and in engagement with the electrode 25 by the screw 72. A lock pin 73 is positioned in the right side of the block 27 for engagement with the hole 21B in the top plate 21. The main support block 27 is connected to electrical ground by a ground strap 75.

As seen most clearly in FIGURE 4, the width of the electrodes 25 and 26 is sufficient to extend across and engage simultaneously each of the legs of the U-shaped core. However, it has been found that better welds are obtained if the plates are welded to the core one at a time. Therefore the levers 31 and 32 are provided with the interlock arrangement of FIGURE 5 which permits one or the other of the levers to be moved upwardly but prevents simultaneous elevation of both.

In FIGURE 5 a pair of locking cam members 80 and 81 are pivoted at 82 and 83 on the back of the plate 84 carried on the front of the main support 27. A spring 86 urges the cam members 80 and 81 toward each other and into engagement with levers 31 and 32 which pass through slots 84A and 84B in the plate 84. A lever 87 pivoted between the control levers overlies each control lever. When one of the control levers is elevated the associated locking cam moves under the lever and locks it in its upward position. Such movement of a control lever closes the associated micro switch 40 or 42. It will be seen that the elevation of one of the levers also causes the lever 87 to be rotated in one direction or the other to prevent upward movement of the non-operated control lever.

The operated control lever is released in response to downward movement of the non-operated control lever. The release mechanism includes the lever 88 pivoted at 89 and having outwardly extending ends adapted for engagement with the lower edges of the locking cams 80 and 81 when the lever 88 is pivoted clockwise or counter-clockwise by one or the other of the control levers 31 or 32. When this occurs, the lever 88 by such engagement of the locking cam member 80 or 81 causes the same to be moved away from its locking position and hence permit the associated control lever 31 or 32 to return to its original position. To prevent accidental rocking of the lever 88 the apparatus includes the spring members 91 and 92 positioned beneath the levers 31 and 32, respectively.

From the above it will be seen that if, for example, the control lever 32 is first moved upwardly the locking cam 81 moves under the lever 32 and locks it in its upward position. Movement of the locking cam 81 causes the micro switch 42 to close the timing circuit so that the above described welding operation takes place. The actual welding requires little time (50 milliseconds in one apparatus for welding plates to the ends of a small U-shaped core). It will be seen that with the lever 32 in its upward position the control lever 31 is locked against upward movement. To weld the second plate to the other leg of the core the operator moves the control lever 31 downwardly into engagement with lever 88 to cause release of the locking cam 81 and permit return of the control lever 32 to the position shown in FIGURE 5. The operator then elevates control lever 31 so that the above procedure again takes place with the micro switch 40 closing the timing circuit to cause the second plate to be welded to the other leg of the core. The control lever 31 is then returned to its original position by movement of the control lever 32 downwardly into engagement with the end of lever 88. Thus it will be seen that only one of the control levers can be elevated at a time and that each control lever is locked in its upward position during the welding. Thus uniform pressure is provided between the electrodes and the plates during the actual welding operation, and any chance of relative movement between the parts during welding is avoided.

Before placing the plates 11 and 12 in the apparatus for welding to the ends of a core all grease and dirt should be removed therefrom and both sides and the end faces of the core should be lightly sanded in the direction of the laminations. Trichloroethylene can be used for removing grease and dirt from the pole pieces. The weld fixture contacts should also be cleaned with trichloroethylene using a stiff brush prior to the actual welding operation. After cleaning, the fixture and the plates should be dried using compressed air. Two pole pieces 11 and 12 are placed in the fixture and pushed all the way to the rear of the depressed slots in the phenolic base plate. After placing the coils on the core legs and cleaning the sides and face of the core with trichloroethylene and drying the same with compressed air, the coil and core assembly is placed in the fixture with the ends of the core legs flat against the pole pieces and the edges of the laminations against the rear copper electrode 26. The weld fixture lever 21 is then lowered and locked in place with the side locking pin, and the cap screws 20 tightened against the top of the core. It will be seen that when the weld fixture arm 21 is moved into its lowered position the front electrode 25 will be held under a yielding pressure against the front edges of the core laminations. The apparatus is then ready for the actual welding operation which is brought about by the operator elevating first one of the control levers, then lowering the other control lever to release the first control lever, and then elevating the second control lever. The final step is to lower the first operated control lever to cause release of the second operated control lever.

By following the above procedure and using the equipment illustrated, it is found that strong uniform resistance welds are achieved. The electrodes 25 and 26 not only serve to hold the core during the welding but also to conduct heat away from the core. The arrangement of the parts is such that the electrodes can be readily removed for cleaning and replacement.

There has thus been disclosed an improved method and apparatus for welding metallic plates such as stainless steel to the end of a laminated core structure. While the invention has been disclosed by reference to presently preferred embodiments, it is intended that those changes and modifications which become obvious to a person skilled in the art as a result of the teachings, hereof will be encompassed by the following claims.

What is claimed is:

1. Apparatus for welding a pole piece to a laminated core comprising in combination; pole piece support means; core holder means for holding a core in a position of engagement with a pole piece positioned on said support means; a first electrode; means holding said first electrode a predetermined distance from said support means and in a position of engagement with a plurality of the laminations of a core when positioned in said core holder means; first pressure means selectively engageable with a core in said holder means and operative to urge the core toward said first electrode to thereby press the edges of the laminations of a core thereagainst; a second electrode; and second electrode actuation means urging said second electrode toward said pole piece support means and into engagement with a pole piece held in position thereby.

2. Apparatus as defined in claim 1 wherein said first pressure means includes a third electrode movable into engagement with the edges of the laminations of a core when positioned in said core holder means.

3. Apparatus as defined in claim 1 and including timing circuit means controlling the initiation and duration of current flow to said electrodes, and including control means responsive to movement of said second electrode by said second electrode actuation means.

4. Apparatus as defined in claim 1 and including second pressure means selectively engageable with a core positioned in said core holder means for urging the core toward said pole piece support means.

5. Apparatus as defined in claim 4 and including pressure actuation means interconnecting said first and second pressure means for simultaneous operation.

6. Apparatus for welding plates to the ends of the legs of a U-shaped laminated core comprising in combination: first and second electrodes; dielectric plate support means having first and second sections for receiving first and second plates and holding the same in position during a welding operation, said support means having first and second openings aligned with said electrodes for the passage of said electrodes therethrough for engagement with the plates to be welded; third and fourth electrodes simultaneously engageable with the opposite edge of the laminations of both legs of a U-shaped core; pressure means engageable with the closed end of a U-shaped core when the open ends thereof are engaged with plates positioned in said plate support means; electric circuit means coupled with said electrodes; and control means coupled with said circuit means for actuating one or the other of said first and second electrodes.

7. Apparatus as defined in claim 6 including a movable electrode holder connected to said third electrode and movable toward and away from said fourth electrode.

8. Apparatus as defined in claim 7 including means coupling said movable electrode holder with said pressure means for movement of said holder toward and away from said fourth electrode when said pressure means is operated.

9. Apparatus as defined in claim 8 wherein said pressure means includes a first lever having adjustable screw means engageable with the closed end of a U-shaped core, and spring means providing a yielding joint between said movable electrode holder and said lever.

10. Apparatus as defined in claim 6 wherein said first and second electrodes are movable toward and away from plates held in said plate support means, and said control means includes first and second control levers coupled with said first and second electrodes, and interlock means coupled with said control levers preventing simultaneous movement of said first and second electrodes toward welding position.

11. Apparatus as defined in claim 10 wherein said interlock means further includes first lock means locking an actuated control lever in its actuated condition, and lock release means coupled with said locking means to release the same in response to movement of the non-actuated control lever.

(References on following page)

References Cited

UNITED STATES PATENTS

| | | | |
|---|---|---|---|
| 1,880,095 | 9/1932 | Ledwinka | 219—107 X |
| 2,582,005 | 1/1952 | Carlson | 29—609 X |
| 2,680,285 | 6/1954 | Furnas | 29—609 |
| 2,845,555 | 7/1958 | Carpenter et al. | |
| 3,262,196 | 7/1966 | Davis | 29—471.1 |

JOSEPH V. TRUHE, *Primary Examiner.*

B. A. STEIN, *Assistant Examiner.*

U.S. Cl. X.R.

29—602; 219—107